United States Patent [19]

Nishmura

[11] Patent Number: 5,280,207

[45] Date of Patent: * Jan. 18, 1994

[54] SPINDLE MOTOR WITH DISK CLAMPING ARRANGEMENT

[75] Inventor: Hideki Nishmura, Nishinomiya, Japan

[73] Assignee: Nippon Densan Corporation, Kyoto, Japan

[*] Notice: The portion of the term of this patent subsequent to Jun. 1, 2010 has been disclaimed.

[21] Appl. No.: 848,166

[22] Filed: Mar. 10, 1992

Related U.S. Application Data

[62] Division of Ser. No. 748,865, Aug. 23, 1991, Pat. No. 5,214,331.

[30] Foreign Application Priority Data

| Aug. 24, 1990 | [JP] | Japan | 2-223503 |
| Aug. 24, 1990 | [JP] | Japan | 2-223504 |
| Sep. 25, 1990 | [JP] | Japan | 2-256476 |

[51] Int. Cl.[5] .................. H02K 7/14; G11B 17/08
[52] U.S. Cl. .................. 310/67 R; 360/98.08
[58] Field of Search .............. 310/67 R; 91, 42, 216, 51, 360/98.08, 99.04, 360/99.08

[56] References Cited

U.S. PATENT DOCUMENTS

| 4,336,470 | 6/1982 | Gutris | 310/67 R |
| 4,634,908 | 1/1987 | Sturm | 310/64 |
| 4,739,427 | 4/1988 | Kilmer et al. | 360/97 |
| 4,894,738 | 1/1990 | Elsasser et al. | 310/156 |
| 4,902,941 | 2/1990 | Merkle et al. | 310/216 |
| 4,965,476 | 10/1990 | Lin | 310/51 |
| 4,992,686 | 2/1991 | Heine et al. | 310/49 R |
| 5,013,957 | 5/1991 | Wrobel | 310/217 |
| 5,092,144 | 3/1992 | Fleming et al. | 70/95 |

Primary Examiner—Emanuel T. Voeltz
Assistant Examiner—C. LaBalle
Attorney, Agent, or Firm—McCormick, Paulding & Huber

[57] ABSTRACT

A spindle motor comprises a housing, a hub which is rotatable relative to the housing, a rotor magnet mounted on the hub, and a stator disposed facing the rotor magnet. A coil holding member for extending a lead section of an armature coil of the stator to the outside thereof is disposed in the housing. Female screw holes into which fixing screws for mounting clamp members are screwed and through holes connecting with the female screw holes are formed in the hub. Furthermore, supporting projections extending toward the housing are disposed in the stator core of the stator, and such supporting projections are supported in the housing.

2 Claims, 3 Drawing Sheets

SPINDLE MOTOR WITH DISK CLAMPING ARRANGEMENT

This is a divisional of co-pending application Ser. No. 07/748,865 filed on Aug. 23, 1991, now U.S. Pat. No. 5,214,331.

BACKGROUND OF THE INVENTION

1. Field of the Invention

The present invention relates to a spindle motor for rotatably driving a recording disk.

2. Description of the Related Art

Generally, motors such as spindle motors comprise a housing, a hub which is rotatable relative to the housing, a rotor magnet mounted on the hub, and a stator facing the rotor magnet. The stator has a stator core fixed to the housing, and an armature coil is wound as required. A recording disk, such as a magnetic disk, is mounted on the hub, and the recording disk is driven to rotate in one piece with the hub in a predetermined direction.

In this type of spindle motor, a lead from an armature coil is formed of a plurality of wires. Such a lead is electrically connected, for example, to one end section of a flexible board, which extends to outside the housing. Connection devices, such as connectors or the like, mounted on the other end section thereof are connected to external connectors. Such a construction is complex, and steps are required to electrically connect the lead section of a coil with the flexible board. The operation is troublesome to perform. Furthermore, when the flexible board is extended outside the housing, the construction is complex, and a process for insulating the housing from the flexible board must be considered.

In this type of spindle motor, recording disks are mounted as follows: a plurality of female screw holes are formed at intervals in the periphery of the end wall section of the hub. Through holes are formed in a clamp member for fastening the recording disk, the through holes of which correspond to the female screw holes. The recording disk is fixedly attached as required by screwing fixing screws to the female screw holes of the hub through the through holes of the clamp member.

However, since the female screw holes disposed on the hub are shaped in such a way that there is a dead end in the middle of the inside thereof, a surface treatment solution does not sufficiently penetrate into the tapered section (i.e., the front end section) of a screw section. Therefore, there is a possibility that an untreated part remains, which may cause contamination or rust.

To solve the above-described problems, female screw holes can also be formed in a shape (not shown) that they pass through the hub in the axial direction thereof. When it is so constructed, the above-mentioned surface treatment solution sufficiently penetrates into the tapered section of a screw hole. Thus, there is only a slight possibility that any part will remain untreated.

Yet, because the through hole in the hub connects the interior of the spindle motor to the disk chamber, there is a danger that grease of the bearing, unclean air, gas, or the like inside the spindle motor will penetrate the disk chamber.

In the above-described motor, the inner edge of the stator core is supported in the housing. The outer edge thereof floats freely from the housing. Therefore, in such a supporting structure, when vibration of a specific frequency is applied thereto, the stator core may resonate, causing an axial deflection. When such a deflection occurs, a head used for reading/writing information of a recording disk cannot track on the surface of the tracks, causing an error.

SUMMARY OF THE INVENTION

An object of the present invention is to provide a spindle motor in which the lead section can be adequately electrically insulated from an armature coil and in which the lead section can easily be extended outside the housing.

Another object of the present invention is to provide a spindle motor in which a surface treatment can be performed and cleanliness is maintained in the tapered section of female screw holes formed in the hub.

A further object of the present invention is to provide a spindle motor which is capable of effectively suppressing an axial deflection of a stator core.

These and other objects, features and advantages of the present invention will become clear when reference is made to the following description of the preferred embodiments of the present invention, together with reference to the accompanying drawings.

DETAILED DESCRIPTION OF THE PREFERRED EMBODIMENT

An embodiment of the present invention will be explained below with reference to the accompanying drawings.

Figure 1:
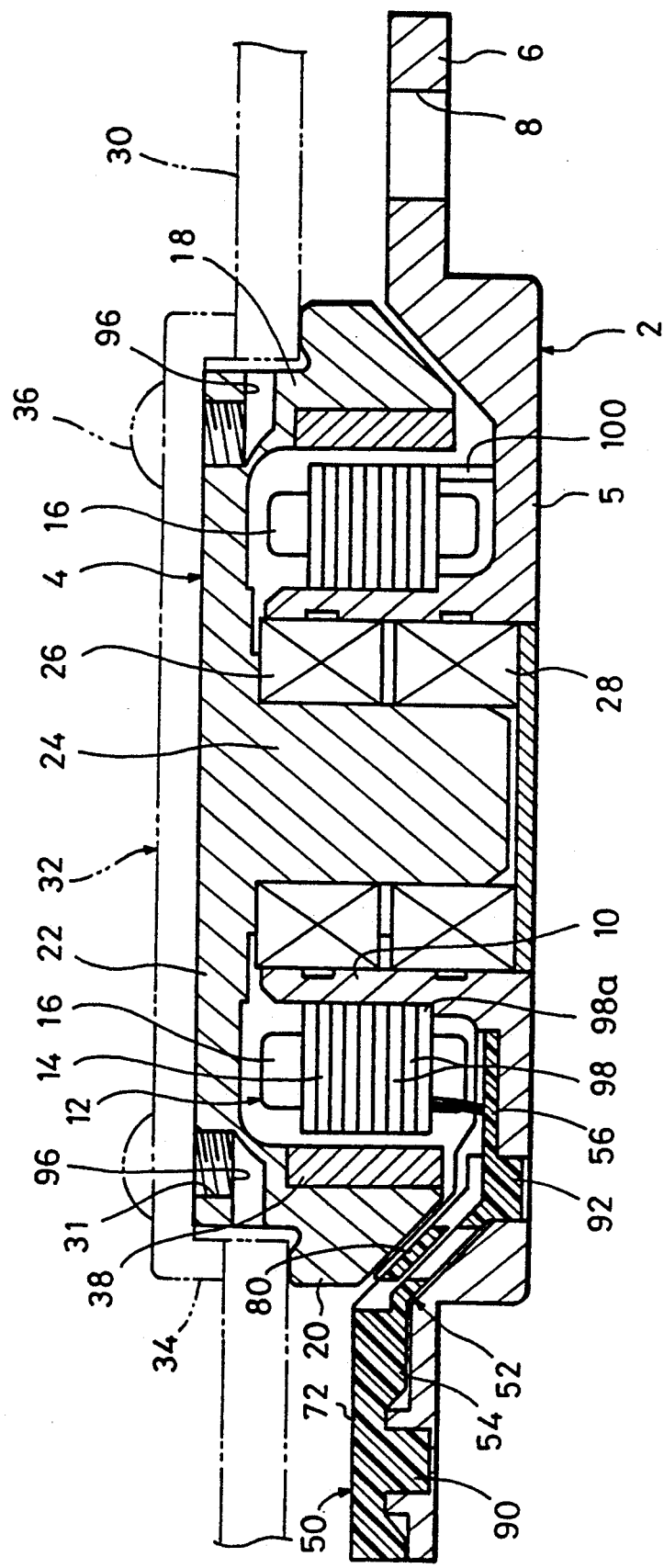
FIG. 1 is a cross-sectional view showing an embodiment of a spindle motor in accordance with the present invention.
Figure 2:
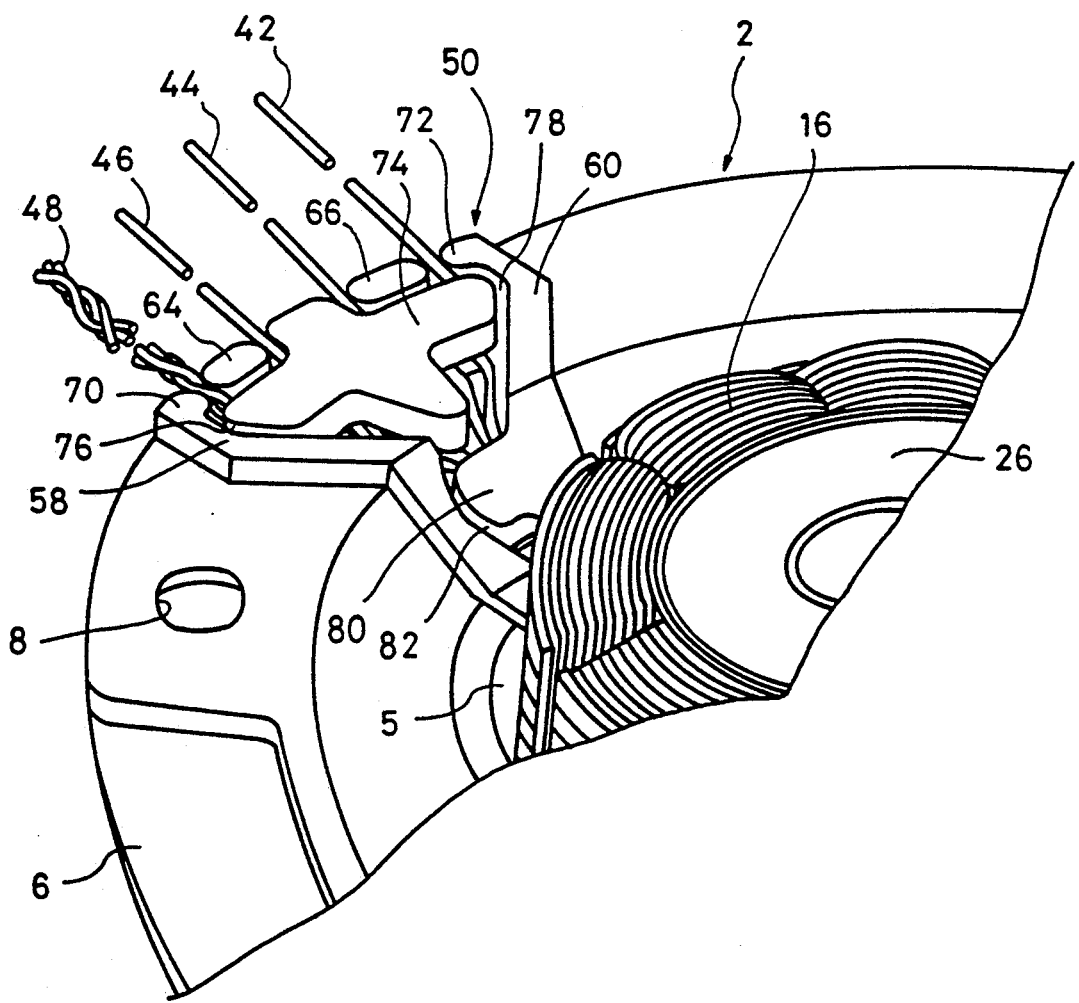
FIG. 2 is a partial perspective view showing a coil holding member and vicinity thereof of the spindle motor in FIG. 1.

The spindle motor shown in the figures comprises a housing 2 and a hub 4 which is rotatable relative to the housing 2. The housing 2 comprises a substantially disc-shaped housing main body 5. A ring-shaped flange 6 is disposed in the outer edge of the housing main body 5. A plurality of holes 8 (one of them is shown in FIGS. 1 and 2) are formed at intervals along the circumference of the flange 6. By screwing mounting screws (not shown) to a frame (not shown) through holes 8, such a spindle motor is mounted on a recording disk driving apparatus and can be used effectively to drive, for example, 2.5-inch magnetic disks.

A cylindrical supporting wall 10, extending substantially vertically, is integrally disposed in the central section of the housing main body 5. Referring to FIG. 2, a stator 12 is mounted on the outer surface of the cylindrical supporting wall 10. The stator 12 has a stator core 14 fixed to the cylindrical supporting wall 10. A plurality of tooth sections (e.g., 9) are disposed at intervals in the circumference of the stator core 14. An armature coil 16 is wound on such tooth sections as required. Improvements to be described later have been made in conjunction with the stator 12.

The hub 4 has a short, cylindrical hub main body 18. A ring-shaped flange 20 is disposed in one end section (the lower end section) of the hub main body 18, and an end wall section 22 is disposed in the other end section of the hub main body 18. A shaft section 24 is disposed to become one piece in the central section of such an end wall section 22. As shown in FIG. 1, the shaft section 24 is rotatably supported on the cylindrical supporting wall 10 of the housing 2 via a pair of bearing members 26 and 28.

A recording disk 30, such as a magnetic disk, is mounted in the hub 4 as follows: A circular opening is formed in the recording disk 30. The inner edge thereof is placed in the flange 20 of the hub 4. A plurality of female screw holes 31 (e.g., 6) are formed at intervals on the circumference of the end wall section 22 of the hub 4. These female screw holes 31 extend to the middle of the end wall section 22, but do not pass through it. A clamp member 32 for clamping the recording disk 30 is substantially circular. A pressing section 34 which is bent at substantially 90 degrees is disposed in the outer edge thereof. A plurality of through holes (e.g., 6) are formed on the outer area (inside of the pressing section 34) corresponding with the female screw holes 31 of the hub 4. The recording disk 30 is placed in the flange 20 in the hub 4. Then, by screwing mounting screws 36 to female screw holes 31 of the hub 4 through the through holes of the clamp member 32, it is mounted on the hub 4 as required. When mounted, as shown in FIG. 1, the recording disk 30 is fastened between the flange 20 of the hub 4 and the pressing section 34 of the clamp member 32. Improvements to be described later have been made in conjunction with the female screw holes 32 of the hub 4.

A rotor magnet 38 is mounted on the inner surface of the hub main body 18. The rotor magnet 38 is placed on the outside of the stator 12 mounted on the housing 2. As a consequence, the hub 4 and the recording disk 30 are rotated in a predetermined direction by the mutual action of the rotor magnet 38 and the stator 12.

Next, referring to FIGS. 1, 2, 3 and 4, a structure for extending the lead section 40 from the armature coil 16 to outside the motor will be explained.

Figure 4:
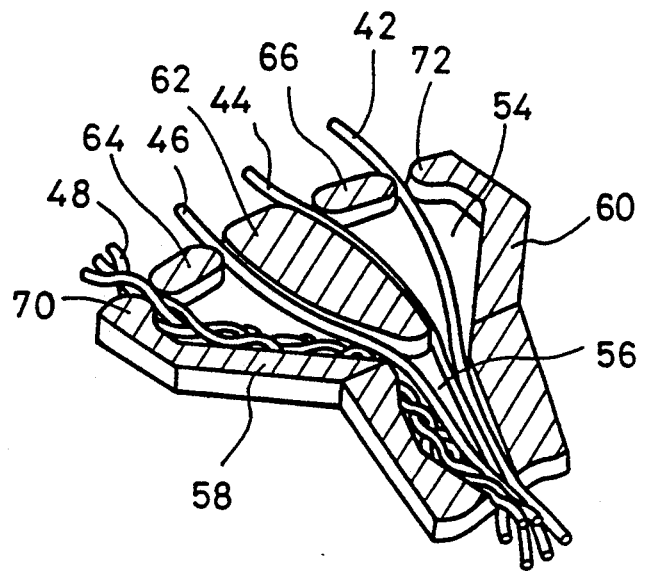
FIG. 4 is a partial perspective view showing a part of the coil holding member of FIG. 2.

In this embodiment, the motor is of a three-phase type. The armature coil 16 is a well-known star-wired armature coil. In FIGS. 2 and 4, the lead sections of the coils of the X-, Y-, and Z-phase are respectively designated by reference numerals 42, 44, and 46. A lead section (three lead sections are bound) of the coil of a common phase type is designated by reference numeral 48. The lead section of the coil is extended to the outside through a coil holding member 50, which can be formed, for example, from a synthetic resin material. It has a bottom wall section 52 extending to the housing main body 5 of the housing 2 and to the flange 6. The bottom wall section 52 has a substantially triangular main body bottom section 54 and an extension bottom section 56 extending in a straight line from the main body bottom section 54. Side wall sections 58 and 60 are disposed on both side sections (from the main body bottom section 54 to the extension bottom section 56) of the bottom wall section 52. An intermediate wall section 62 is disposed in the central section of the main body bottom section 54 in a widthwise direction and extends from the upstream end section of the main body bottom section 54 (the lower right end section in FIGS. 2 and 4) to the downstream end section (the upper left end section in FIGS. 2 and 4). In this embodiment, a first auxiliary wall section 64 is disposed at a position between the one side wall section 58 and the intermediate wall section 62, in the lower end of the main body bottom section 54. A second auxiliary wall section 66 is disposed at a position between the other side wall section 60 and the intermediate wall section 62. The intermediate wall section 62 extends narrowly in the same direction as the lead section of the extended coil. The first and second auxiliary wall sections 64 and 66 are substantially circular. A first projection section 70 projecting toward the first auxiliary wall section 64 is disposed in the downstream end section of the one side wall section 58. A second projection section 72 projecting toward the second auxiliary wall section 66 is disposed in the downstream end section of the other side wall section 60. With such a construction, as seen in FIG. 4, the one side wall section 58 and the first auxiliary wall section 64 define the first extension space. The first auxiliary wall section 64 and the intermediate wall section 62 define a second extension space. The intermediate wall section 62 and the second auxiliary wall section 66 define a third extension space. The second auxiliary wall section 66 and the other side wall section 60 define a fourth extension space.

A ceiling wall section 74 extending from side to side in FIG. 2 is disposed above the main body bottom section 54. One end of the ceiling wall section 74 extends toward the one side wall sections 58, and a first insertion slit 76 is defined between the one end and the side wall section 58. The other end of the ceiling wall section 74 extends toward the other side wall section 60, and a second insertion slit 78 is defined between the other end and the other side wall section 60.

In this embodiment, an auxiliary ceiling wall 80 is disposed over the other side wall section 60, above the extension bottom section 56. The free end thereof extends to the one side wall section 58, and a slit 82 is defined between the free end and the side wall section 58.

The lead section from each armature coil is positioned as follows: as shown in FIGS. 2 and 4, the lead section 42 of the X-phase coil is positioned between the fourth extension space (between the other side wall section 60 and the second auxiliary wall section 66) through the slit 82 and the second insertion slit 78. The lead section 44 of the Y-phase coil is positioned between the third extension space (between the second auxiliary wall section 66 and the intermediate wall section 62) through the slit 82 and the second insertion slit 78. The lead section 46 of the Z-phase coil is positioned between the second extension space (between the intermediate wall section 62 and the first auxiliary wall section 64) through the slit 82 and the first insertion slit 76. The lead section 48 of a common coil is positioned in the first extension space (between the first auxiliary wall section 64 and the one side wall section 58) through the slit 82 and the first insertion slit 76. When the lead sections 42, 44, 46 and 48 of the coil are positioned as described above, either of the first auxiliary wall section 64, the intermediate wall section 62 or the second auxiliary wall section 66 is between adjacent lead sections. These lead sections 42, 44, 46 and 48 are reliably insulated. In this mounted condition, the ceiling wall section 74 and the auxiliary ceiling wall 80 cover the lead sections 42, 44, 46 and 48, thus preventing the separation thereof. The lead sections 48 and 42 are positioned on the side slightly more toward the center than the inner side surface of the side wall sections 58 and 60 by the action of the first projection section 70 and the second projection section 72. Therefore, the lead sections 48 and 42 can be prevented from separating from the first insertion slit 76 and the second insertion slit 78, respectively.

Figure 3:
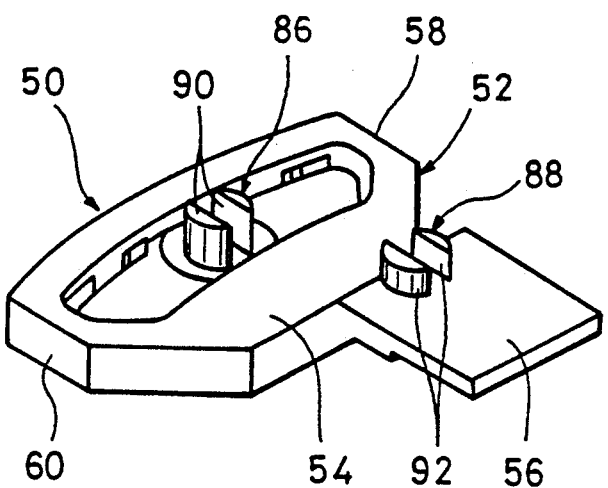
FIG. 3 is a perspective view seen from below showing the coil holding member of FIG. 2.

In this embodiment, as shown in FIG. 3, fixing means 86 and 88 are disposed on the bottom surface of the bottom wall section 52, and more exactly, on the bottom surface of the main body bottom section 54 and the extension bottom section 56. The fixing means 86 and 88 comprise a pair of substantially semi-cylindrical projections 90 and 92. These projections 90 and 92 are capable of being slightly elastically deformed in a direction in which they come nearer to or come apart each other. Through holes (see FIG. 1) are formed in the housing 2, and more exactly, on specific positions of the housing main body 5 and the flange 6. The fixing means 86 and 88 of the coil holding member 50 are inserted into these through holes. When mounted in the above way, as shown in FIG. 1, the main body bottom section 54 of the coil holding member 50 is positioned on the flange 6. The extension bottom section 56 thereof extends from the inner edge of the flange 6 toward the center in a radial direction to the housing main body 5.

The following improvements have been made in conjunction with the hub 4. The female screw holes 31 formed in the end wall section 22 of the hub 4 extend in the axial direction thereof. Through holes 96 corresponding to the female screw holes 31 are formed on the outer surface of the hub main body 18. The through holes 96 extend linearly toward the center in a radial direction and are connected with the front end section of the female screw holes 31. The formation of the through holes 96 in the hub 4 as described above causes a processing solution to flow through the female screw holes 31 and the through holes 96. In particular, the solution fully penetrates even the tapered section of each of the female screw holes 31. Therefore, a surface treatment for the hub 4 can be performed reliably, and no places will remain untreated. The hub 4 may be made of aluminum, stainless steel or the like. In this case, a process for preventing rust is performed. In addition to the above materials, iron may be used. In such a case, a plating process is performed as a surface treatment for the hub 4.

Next, improvements made in the stator 12 will be explained. The stator core 14 is formed by laminating a plurality of coil plates 98. Supporting projections 100 extending toward the housing main body 5 are disposed in the bottommost plate 98G of the stator core 14. Such supporting projections 100 can be formed by forming the tooth sections of the bottommost plate 98G slightly larger than those of the other plates and by bending the outer edge projecting from the other plates in a downward direction. The supporting projections 100 are not clearly shown, but are disposed at every third tooth in the tooth sections of the shaft section 24. These projections are not limited to such a disposal arrangement, as they may be disposed at every other tooth, or at all the teeth. Each front end section of the supporting projections 100 thus disposed extends to the housing main body 5 and is fixed on the inner surface thereof by a bonding agent or the like.

With the above-described support structure, as shown in FIG. 1, the inner edge of the stator 12 is reliably supported on the outer surface of the cylindrical supporting wall 10 of the housing main body 5, and the outer edge thereof is reliably supported on the inner surface of the housing main body 5 via the supporting projections 100. As a result, the structure in which the stator 12 is mounted to the housing main body 5 has a so-called loop shape. Therefore, the support structure of the stator core 12 has a level of rigidity higher than that in the prior art. As a result, the natural frequency of the motor is increased, and thus the vibration-proof characteristic of the motor is considerably improved. The supporting projections 100 may be fixed to the housing main body 5 by a method in which they are inserted into the mounting holes formed in the housing main body 5 instead of bonding them to the housing main body. Also, the support structure of the stator 12 can be similarly applied to various types of motors other than spindle motors.

Many different embodiments of the present invention may be constructed without-departing from the spirit and scope of the present invention. It should be understood that the present invention is not limited to the specific embodiments described in this specification, and is only limited in the appended claims.

What is claimed is:

1. A spindle motor comprising:
a hub on which a recording disk is mountable; a rotor magnet mounted on the hub; and a stator disposed facing the rotor magnet, wherein said hub has a main body and an end wall provided at one end portion of the main body, a plurality of screw holes for securing a clamp member securing said recording disk are provided in the end wall of the hub, a through hole is formed corresponding to each of the plurality of screw holes, and each through hole opens onto an outer circumferential surface of the hub.

2. A spindle motor according to claim 1, wherein the screw holes extend in the axial direction of the hub, and wherein the through holes extend substantially in a radial direction.

* * * * *